US006164163A

United States Patent [19]

Lesueur et al.

[11] Patent Number: 6,164,163

[45] Date of Patent: Dec. 26, 2000

[54] PROCESS FOR MECHANICALLY REMOVING THE ENCAPSULATING MATERIAL FROM A FIBER-OPTIC RIBBON CABLE AND TOOL FOR IMPLEMENTING THE PROCESS

[75] Inventors: Philippe Lesueur, Tregastel; Bruno Leguen, Lannion; Philippe Egon, Pleumeur Bodou; Christian Liegeois, Soisy sur Seine, all of France

[73] Assignee: Cables Pirelli, Saint-Maurice, France

[21] Appl. No.: 09/022,393

[22] Filed: Feb. 12, 1998

[30] Foreign Application Priority Data

Feb. 13, 1997 [FR] France .................................. 97 01660

[51] Int. Cl.[7] ...................................................... H02G 1/12

[52] U.S. Cl. ............................ 81/9.51; 30/90.1; 30/90.4; 30/90.6

[58] Field of Search .............................. 81/9.51; 30/90.1, 30/90.4, 90.6

[56] References Cited

U.S. PATENT DOCUMENTS

| | | |
|---|---|---|
| 4,046,298 | 9/1977 | Schroeder, Jr. . |
| 4,275,619 | 6/1981 | Shimizu . |
| 4,538,487 | 9/1985 | Hatfield et al. . |
| 5,272,941 | 12/1993 | English et al. . |
| 5,337,633 | 8/1994 | Carpenter et al. . |
| 5,389,192 | 2/1995 | Takimoto et al. . |
| 5,479,701 | 1/1996 | Yamano et al. . |

FOREIGN PATENT DOCUMENTS

| | | |
|---|---|---|
| 0 650 237 A2 | 4/1995 | European Pat. Off. . |

OTHER PUBLICATIONS

N. Masaaki et al., "Clad Removing Method For Tape Type Optical Fiber Core", Patent Abstracts of Japan, 012(276):737 (1988).

O. Keiji et al., "Discrete Separation of Multi–Cored Optical Fiber Core", Patent Abstracts of Japan, 012(497):806 (1988).

*Primary Examiner*—Timothy V. Eley
*Assistant Examiner*—Willie Berry, Jr.
*Attorney, Agent, or Firm*—Finnegan, Henderson, Farabow, Garrett & Dunner, L.L.P.

[57] ABSTRACT

The tool is constituted, on one hand, by a lower plate (12) traversed by a calibrated orifice, between an admission chamber (14) equipped with a roller (18) and a cutting plate (15) and, on the other hand, by an upper cover (22) also pierced by an opening (24) emerging in an inlet chamber (26) equipped with a roller (28). The upper cover is placed above the lower plate at distance that is variable so that the calibrated orifice and the opening are aligned, or can be offset heightwise.

14 Claims, 4 Drawing Sheets

PROCESS FOR MECHANICALLY REMOVING THE ENCAPSULATING MATERIAL FROM A FIBER-OPTIC RIBBON CABLE AND TOOL FOR IMPLEMENTING THE PROCESS

BACKGROUND OF THE INVENTION

The invention relates to the technical field of fiber-optic ribbon cables and, more precisely to a process and a tool enabling a part of the encapsulating material to be removed to bare the fibers that it contains.

A fiber-optic ribbon cable is known to be constituted by a plurality of optical fibers generally arranged side by side to form a strip or band, and embedded in an envelope constituted by an encapsulating material, for example a polymer, which forms the flexible ribbon and protects the fibers.

This encapsulating material has to be easily removable, at least over a certain length, so as to bare the fibers when, for example, a splice has to be effected. Hitherto, this operation was carried out by hand, given the pieces of encapsulating material that had to be removed from the optical fibers.

To obviate this drawback, the Applicant has developed a tool that makes it possible both to effect incisions at desired points in the ribbon, and also to remove the encapsulating material, after the incisions have been made.

SUMMARY OF THE INVENTION

The main object of the invention is thus a process for mechanically removing the encapsulating material from a fiber-optic ribbon cable consisting in:

making a transverse incision on the opposite two faces of the ribbon cable, at a distance from its end corresponding to the length of encapsulating material to be removed;

- making a longitudinal incision in the two side edges of the ribbon cable between the transverse incision and the end of the cable;
- pressing the ribbon cable against at least one rotary cylinder so that the encapsulating material is detached in halves from the optical fibers.

A second main object of the invention is a tool for implementing the process, which tool is constituted by a lower plate equipped with a cutting plate and at least one initial incision blade, as well as by an upper cover, the plate and the cover delimiting at least one internal space in which are housed two rollers around which winds the ribbon cable passing through the said internal space between a calibrated orifice and an opening provided in the tool to allow through the ribbon cable.

According to a first form of embodiment of the tool, the lower plate is traversed by a calibrated orifice between an admission chamber equipped with at least one roller and a cutting plate ; furthermore, an upper cover is also pierced by an opening emerging in an inlet chamber equipped with at least one roller, the said upper cover being above the lower plate at a distance that is variable so that the calibrated orifice and the opening are aligned or offset heightwise.

The cutting plate of the lower plate bears two incision blades which face one another, their cutting edges being inclined in the direction of the calibrated orifice.

According the invention, an initial incision blade, which is upwardly slidable, is fixed to the lower plate, below the cutting plate, and another initial incision blade, which is downwardly slidable, is fixed on the end of the upper cover.

According to another form of embodiment of the tool, the lower plate and the upper cover are pressed against one another and traversed by a central shaft in which emerge, on one side, the opening, and, on the other side, the calibrated orifice.

BRIEF DESCRIPTION OF THE FIGURES

Further particular features and advantages of the invention will emerge from the following description of a non-limitative example of embodiment, in which reference is made to the annexed drawings, which show.

DETAILED DESCRIPTION OF THE PREFERRED EMBODIMENT

Figure 1:
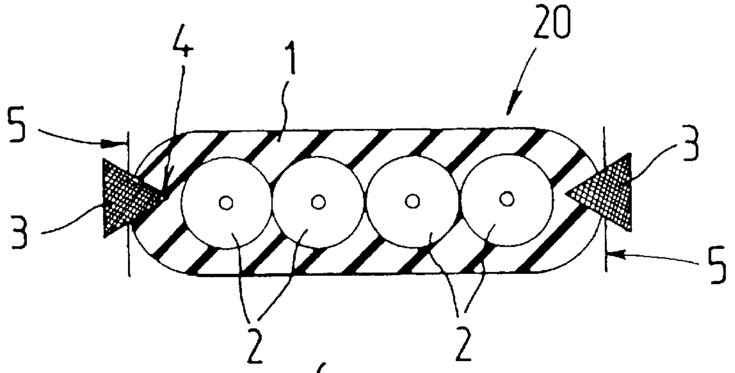
FIG. 1, a schematic transverse cross-sectional view of a fiber-optic ribbon cable with the incision blades.
Figure 2:
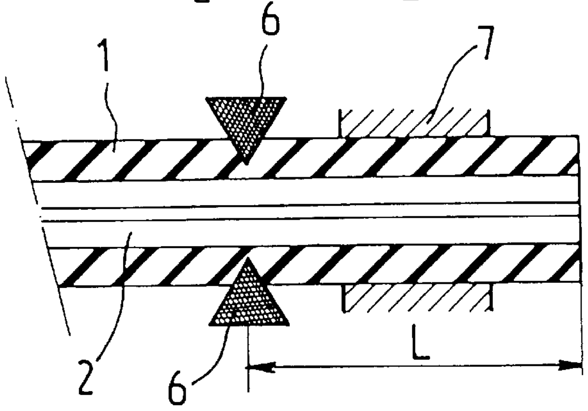
FIG. 2, a schematic, longitudinal cross-sectional view of the ribbon cable with the initial incision blades.

It can be seen from FIGS. 1 and 2 how the preliminary incisions are made on a ribbon cable 20 constituted by an encapsulating material 1 and by a plurality of optical fibers 2. Two incision blades 3 (FIG. 1) are pressed against the lateral edges of the ribbon cable, and the spacing of the two blades is adjusted so that their ends 4 do not touch the fibers 2.

When the ribbon cable is displaced longitudinally, being guided between lateral surfaces 5, an incision will be made on either side in the longitudinal direction of the ribbon cable.

An incision is also made on either side of the ribbon cable, over its entire width, as can be seen from FIG. 2. For this purpose, use is made of other, initial incision blades 6 which cut the encapsulation material 1 over its entire width. The blades are positioned at a distance L from the end of the ribbon cable, which corresponds to the length of the sheathing to be removed, and they act on the cable when the latter is immobilised. Blades 6 are adjusted so that they do not damage the fibers, thanks, in particular, to guide stops 7.

When these incisions have been made, encapsulating material 1 can be removed.

Figure 3:
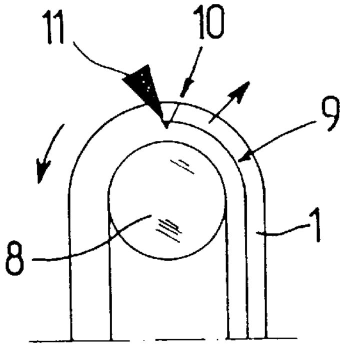
FIGS. 3 and 4, schematic cross-sectional views illustrating two stages in the encapsulating material removal process.
Figure 4:
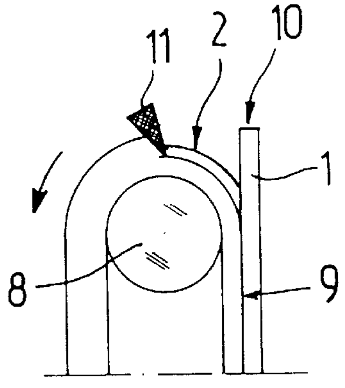

FIGS. 3 and 4 illustrate the way in which the material is removed.

The ribbon cable is drawn over a small diameter rotary cylinder 8 in the direction indicated by the arrow. It has been previously subjected to a longitudinal incision 9 and to a transverse incision 10 which delimits the distance L to which the optical fibers have to be bared. A removal blade 11 is placed vertically above cylinder 8 and inclined in the direction from which the ribbon cable arrives. When the non-incised cable passes over the cylinder (FIG. 3), blade 11 remains pressed against the outside of the cable.

Immediately transverse incision 10 reaches the said blade, half of the encapsulating material is detached from the other half, owing to the presence of incisions 9 and 10, as well as to the curvature of cylinder 8, assisted by the removal blade (FIG. 4), which promotes the detaching of the encapsulation material. The elasticity of encapsulating material 1 contributes to separating this first half of the sheathing from the opposite half, which continues to wind round the cylinder. The operation is then repeated in the other direction, and the second half of the encapsulating material is thus removed.

A single tool 30 can be used to effect these successive stages. A first schematic first form of embodiment is described with reference to FIGS. 5, 6 and 7.

Figure 5:
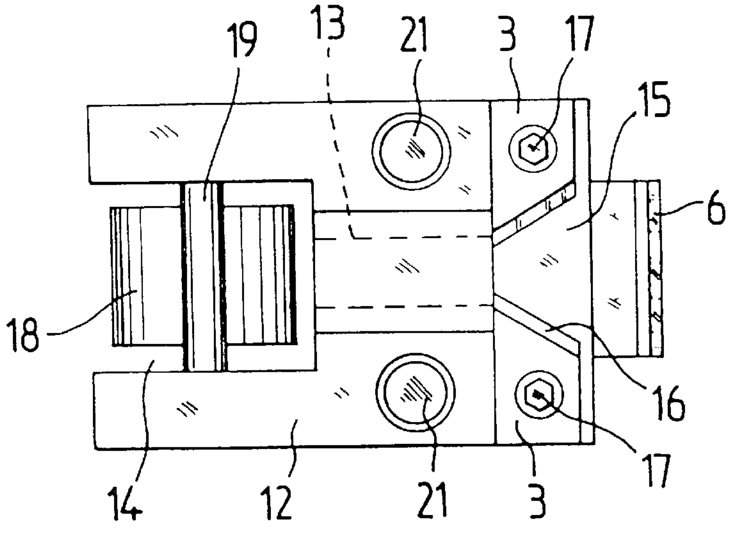
FIGS. 5 and 6, plan and vertical cross-sectional views, respectively, of the lower plate of a first form of embodiment of the tool.
Figure 6:
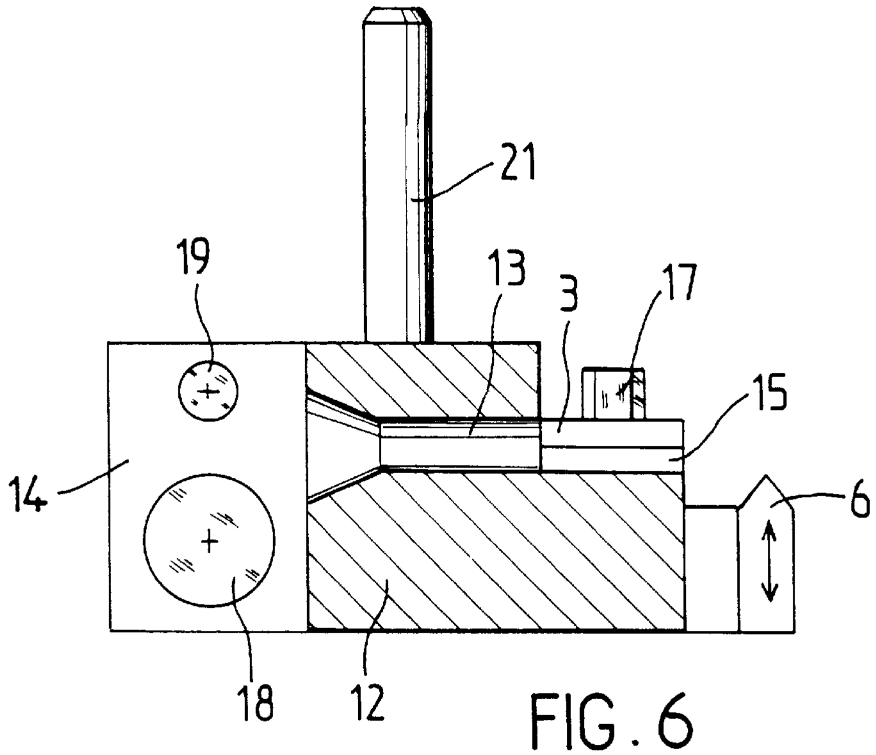

FIGS. 5 and 6 show the lower plate 12 of the tool, traversed by a calibrated horizontal orifice 13 to allow through the ribbon cable, between an admission chamber 14 and a cutting plate 15. The latter bears two incision blades 3 which face one another, their cutting edges 16 being inclined in the direction of orifice 13. Adjusting screws 17 serve to maintain the gap between the blades 3 and their height in relation to the cutting plate. Below cutting plate 15, an upwardly slidable initial incision blade 6 is fixed to lower plate 12. On the other side of the lower plate, the admission chamber 14 is equipped with a roller 18 mounted idle on a horizontal pin and the generating line of which is substantially level with calibrated orifice 13. A guide roll 19 is also mounted in chamber 14, above roller 18.

Figure 7:
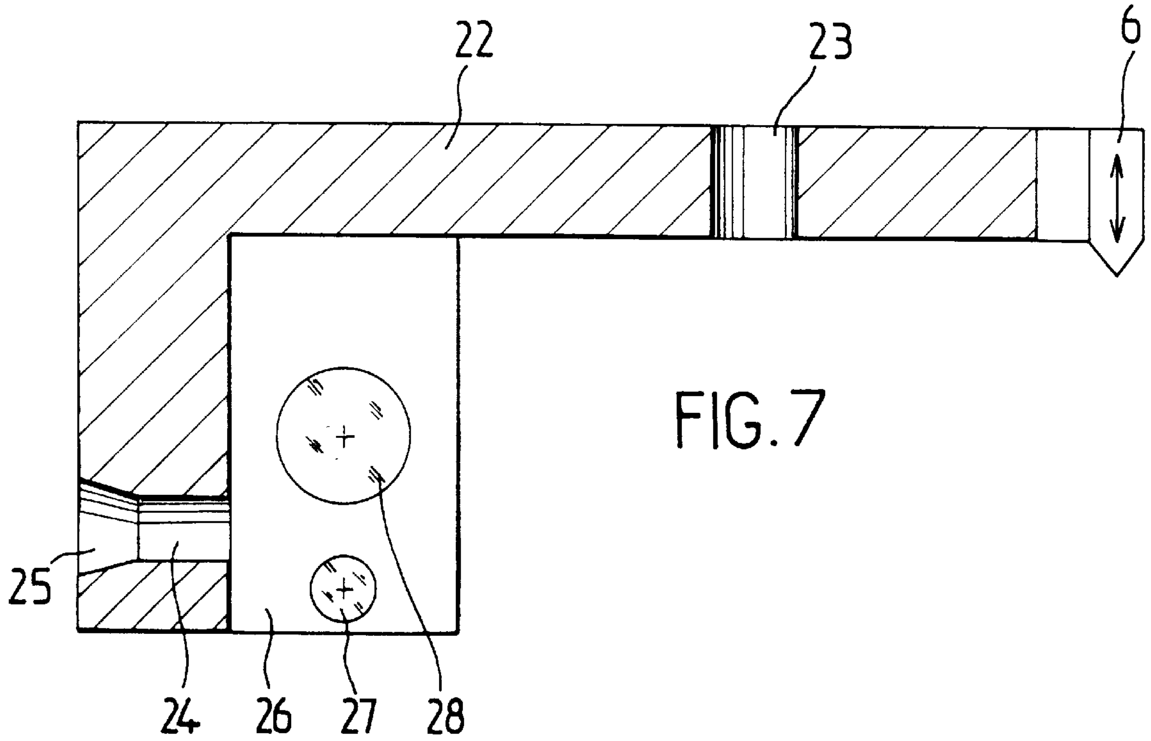
FIG. 7, a vertical cross-sectional view of the upper cover of the tool.

Finally, plate 12 of the tool bears lateral guide pillars 21 which extend vertically and which are designed to receive the upper cover 22 of the tool, shown in FIG. 7. This L-shaped cover is provided, on its upper portion, with two holes 23 by means of which it can be fitted onto guide pillars 21 of plate 12.

The lateral portion of the cover (on the left in the figure) is pierced by an opening 24 ending externally in a flaring inlet cone 25. The opening emerges in an inlet chamber 26, also equipped with a roller 28 mounted idle on a horizontal pin, a guide roll 27 being placed below the said roller. The lower generating line of roller 28 is substantially level with opening 24. Finally, the end of the cover is equipped with a downwardly slidable initial incision blade 6.

The implementation and operation of the tool will now be described with reference to FIGS. 8 and 9.

The first operation is to place upper cover 22 over lower plate 12 by engaging it, via holes 23, on guide pillars 21. The cover is not fully lowered, and it is immobilised in such a way that orifice 13 and opening 24 are aligned. Rollers 18 and 28 are located respectively below and above a central area aligned with orifice 13 and opening 24. As shown in FIG. 8, ribbon cable 20 has been engaged in the inlet cone 25, and then in opening 24. It next passes through chambers 26 and 14, in which it is guided between roller 28 and roll 27, and then between roller 18 and roll 19. Finally, after passing through orifice 13, it has reached cutting plate 15 and exits from tool 30, between the two initial incision blades 6.

The user can then pull ribbon cable 20 out from the tool in the direction indicated by the arrow (FIG. 8) until the required baring length L, delimited by initial incision blades 6, is obtained.

Figure 9:
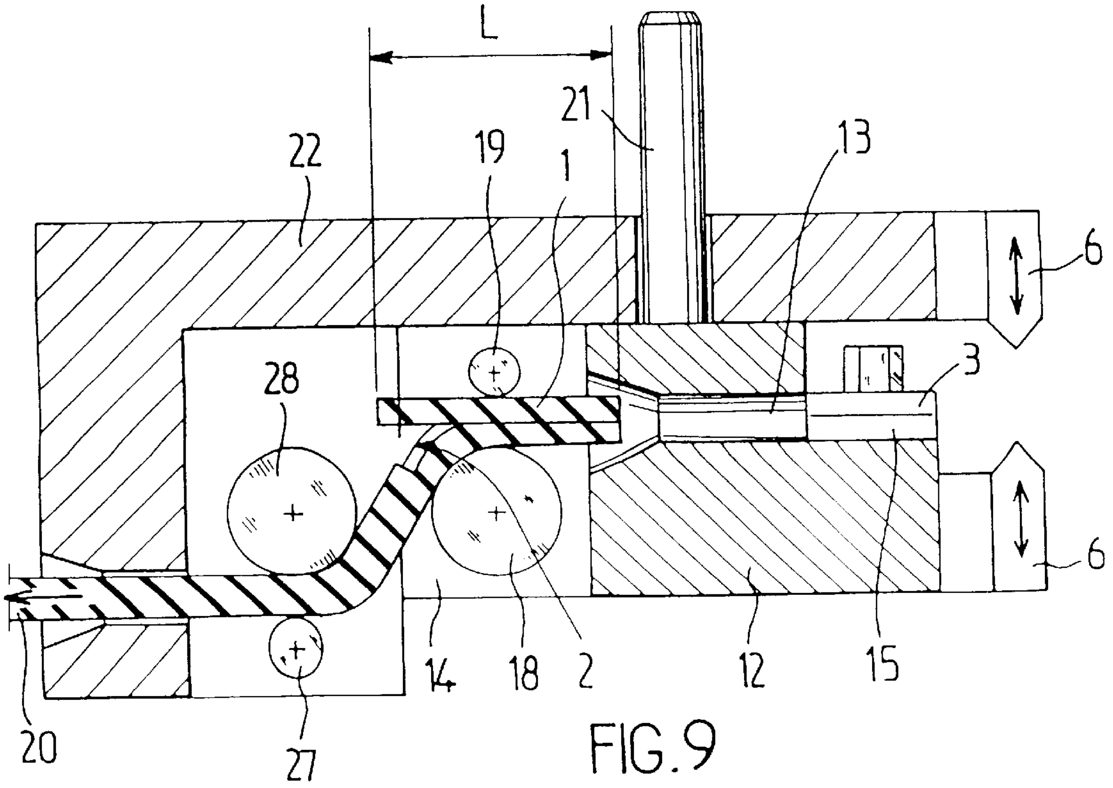
FIG. 9, a vertical cross-sectional view of the tool as a whole, during the encapsulating material removal stage.

The second operation is to move cover 22 down along pillars 21 until it comes into contact with lower plate 12 (FIG. 9). The tool is thus in closed position, and it can be seen that the two rollers, 18 and 28, are located at the same level, which causes ribbon cable 20 to bend first around roller 18, and then, in the opposite direction, around roller 28. Blades 6 are then acted on to make the initial incisions.

When the operator pulls the ribbon cable from right to left, in the direction of the arrow in FIG. 9, the end of the said cable, starting from the transverse cut made by blades 6, will be subjected to the edges 16 of blades 3, which will made a lateral incision on each side of the cable, according to the process schematically represented in FIG. 1. At the outlet from calibrated orifice 13, ribbon cable 20 passes round the first roller 18 and, when its end portion, following the transverse incision, escapes from guide roll 19, an upper half of the sheathing detaches from the curve of roller 18 and is deployed in chamber 14. Ribbon tape 20 then passes round the other roller, 28, which leads to the detaching of the lower half of the sheathing, which is deployed in chamber 26.

At the outlet from the tool, the ribbon cable is thus bared over the desired length L.

Figure 8:
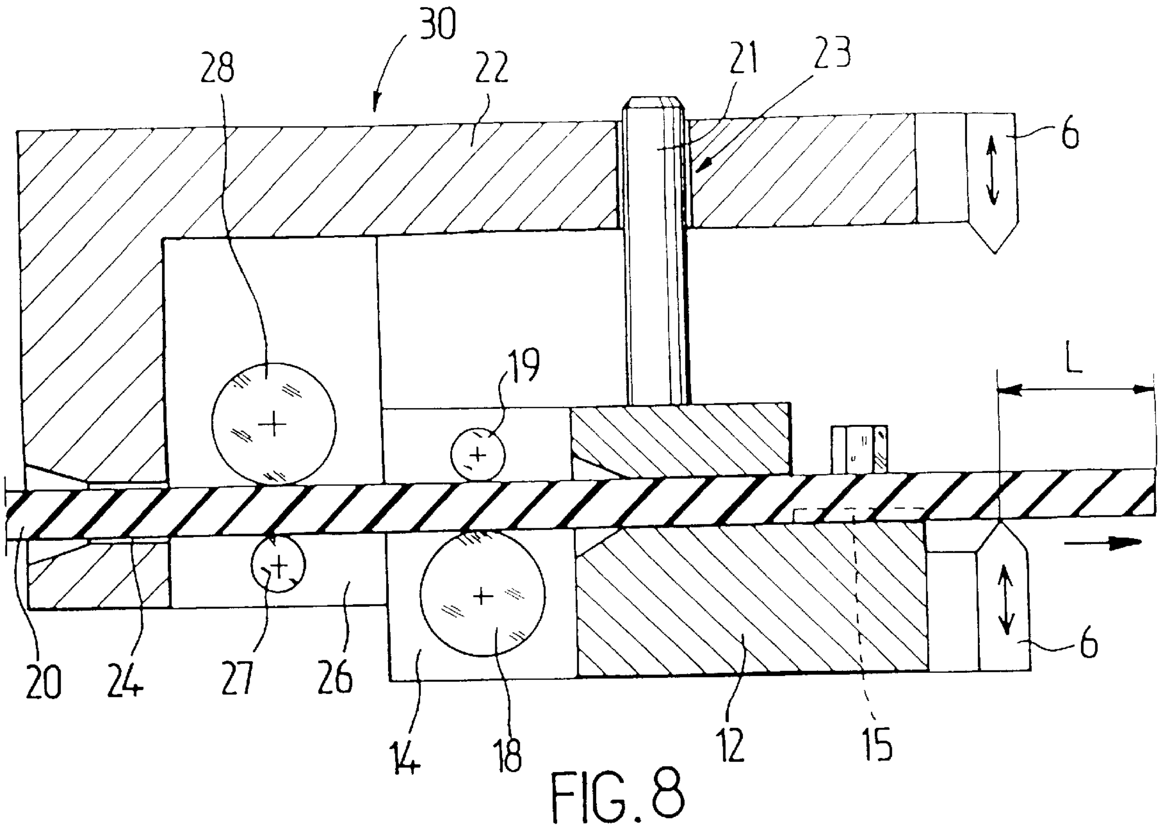
FIG. 8, a vertical cross-sectional view of the tool as a whole, during the ribbon cable introduction stage.
Figure 10:
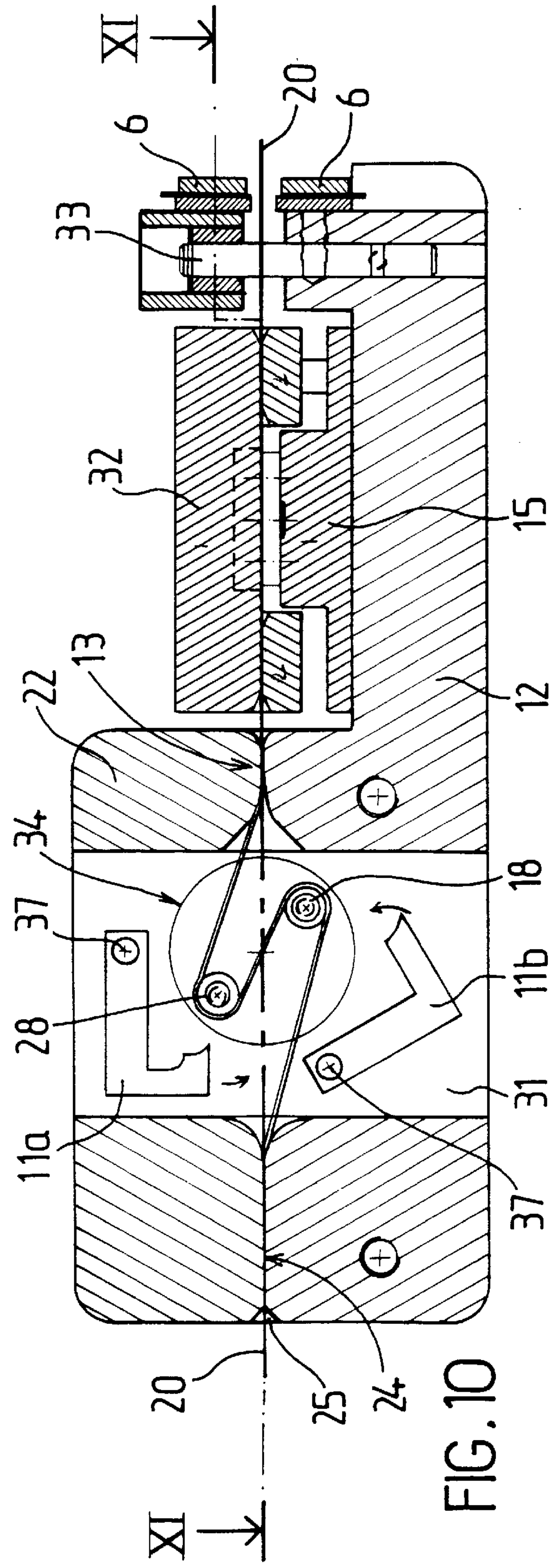
FIG. 10, a vertical cross-sectional view of another form of embodiment of the tool.
Figure 11:
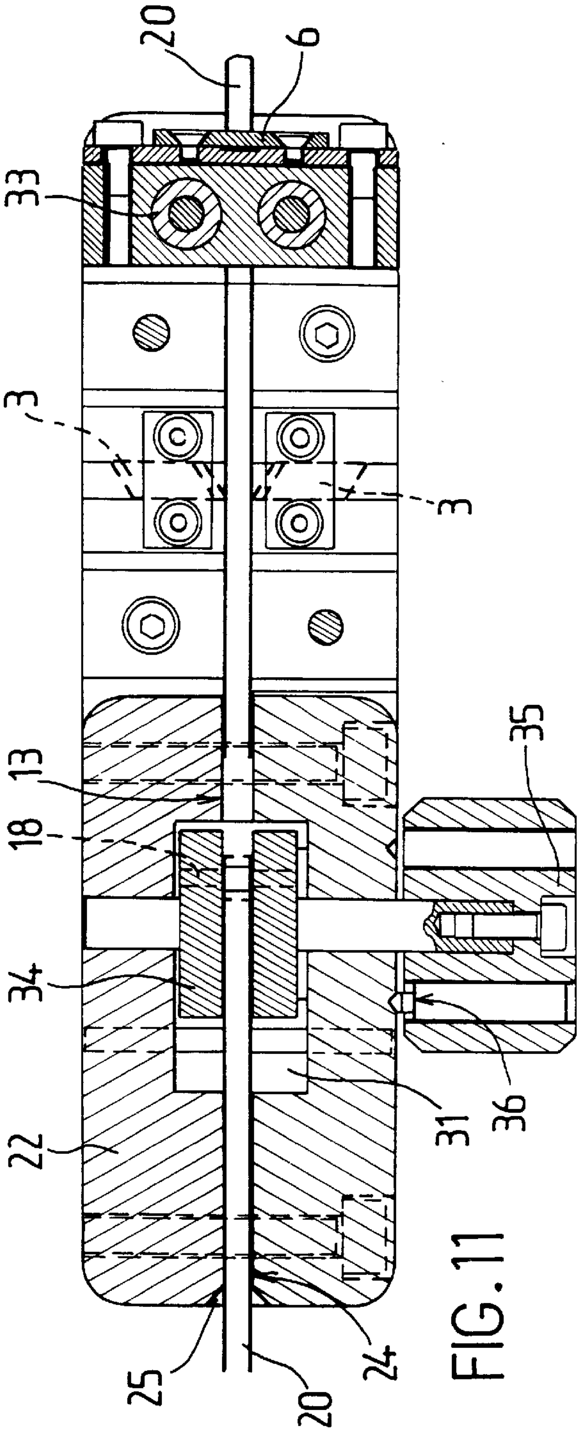
FIG. 11, a view along line XI—XI of FIG. 10.

FIGS. 10 and 11 illustrate another form of embodiment of tool 30 shown in FIGS. 8 and 9, with the same items bearing the same reference numbers.

Lower plate 12 and upper cover 22 are pressed against one another and their configurations form a vertical shaft 31 into which there emerge, on one side, opening 24 with its flaring inlet cone 25 and, on the other side, calibrated orifice 13. It will be observed that a downwardly sliding pressing block 32 enables ribbon cable 20 to be pressed against cutting plate 15, between incision blades 3. It will likewise be observed that initial incision blades 6 slide along vertical guide pillars 33. Inside shaft 31, rollers 18 and 28, with horizontal axes, are mounted on a revolving plate 34, also having a horizontal axis, the rotation of which is controlled by a knob 35, external to the tool, fitted with a catch 36. In shaft 31 are also mounted an upper scraper, 11*a*, and a lower scraper, 11*b*, which perform the part of the removal blade described with reference to FIGS. 3 and 4. These scrapers, which are generally L-shaped, each pivot about a horizontal pin mounted on upper plate 12 and cover 22 of the tool, respectively. A spring, not shown, biases them in the direction of the arrows in such a way that their bevelled ends come to bear against the ribbon cable, in the area of the rollers (18, 28).

The tool functions in a way similar to that described with reference to FIGS. 8 and 9, allowing for certain structural differences between the two forms of embodiment.

To introduce the ribbon cable into tool (20) (from left to right in FIG. 10), knob 35 is first turned so that the scrapers are moved away from the axis of passage of the ribbon cable between opening 24 and orifice 13. The cable is then introduced through the opening and then through the orifice and, finally, into the space between block 32 in top position and cutting plate 15. The desired length of cable to be bared, delimited by the initial incision blades 6, is drawn out of the tool.

Before the ribbon cable is extracted from the tool in order to remove the encapsulating material, block 32 is moved downwards so that the cable is positioned and held between blades 3, and the knob is turned so that the rollers (18, 28) cause the cable to deviate from its rectilinear path by imparting thereto an S bend, as seen in FIG. 10. Biased by their respective springs, the ends of scrapers 11 engage, respectively, the upper and lower faces of the ribbon cable. After the transverse cut has been made by blades 6, blades 3 will made the lateral incisions in the sheathing, the upper and lower portions of which will become detached as they pass over the rollers (18, 28), assisted therein by scrapers 11.

What is claimed is:

1. Tool for mechanically removing encapsulating material from a fiber-optic ribbon cable, comprising:

a lower plate equipped with at least one initial incision blade and a cutting plate said cutting plate comprising two lateral incision blades; and an upper cover;

wherein the lower plate and the upper cover delimit at least one internal space in which at least two rollers are housed, and wherein said ribbon cable passes through the internal space between a calibrated orifice and an opening provided in the tool and winds around said at least two rollers.

2. Tool according to claim 1, wherein a downwardly slidable initial incision blade is fixed on the end of the upper cover.

3. Tool according to claim 1, wherein the lower plate and the upper cover are pressed against one another and traversed by a vertical shaft into which emerge, on one side, the opening and, on the other side, the calibrated orifice.

4. Tool according to claim 1, wherein a sliding pressing block presses the ribbon cable against the cutting plate, between the incision blades.

5. Tool according to claims 3, wherein a sliding pressing block presses the ribbon cable against the cutting plate, between the incision blades.

6. Tool for mechanically removing encapsulating material from a fiber-optic ribbon cable, comprising:

a lower plate equipped with a cutting plate and at least one initial incision blade; and an upper cover;

wherein the lower plate and the upper cover delimit at least one internal space in which at least two rollers are housed, and wherein said ribbon cable passes through the internal space between a calibrated orifice and an opening provided in the tool and winds around said at least two rollers; and wherein the lower plate is traversed by a calibrated orifice, between an admission chamber equipped with at least one lower roller and a cutting plate, the upper cover is pierced by an opening emerging in an inlet chamber equipped with at least one upper roller, and said upper cover is placed above the lower plate at a distance that is variable so that the calibrated orifice and the opening are aligned or offset heightwise.

7. Tool according to claim 6, wherein the cutting plate of the lower plate bears two incision blades which face one another, their cutting edges being inclined in the direction of the orifice.

8. Tool according to claim 6, wherein an upwardly slidable initial incision blade is fixed on the lower plate, below the cutting plate.

9. Tool according to claim 6, wherein the upper generating line of the lower roller is level with the calibrated orifice, and a first guide roll is mounted above the lower roller.

10. Tool according to claim 6, wherein the lower plate bears lateral guide pillars onto which fits the upper cover.

11. Tool according to claim 6, wherein the lower generating line of the upper roller is level with the opening, and a second guide roll is mounted below the upper roller.

12. Tool for mechanically removing encapsulating material from a fiber-optic ribbon cable, comprising:

a lower plate equipped with a cutting plate and at least one initial incision blade;

an upper cover;

at least two rollers housed within at least one internal space delimited by the lower plate and the upper cover, wherein said ribbon cable passes through the internal space between a calibrated orifice and an opening provided in the tool and winds around said at least two rollers;

wherein the lower plate and the upper cover are pressed against one another and traversed by a vertical shaft into which emerge, on one side, the opening and, on the other side, the calibrated orifice; and wherein the at least two rollers are mounted inside the vertical shaft on a revolving plate, and rotation of the rollers is controlled by knob external to the tool.

13. Tool according to claim 12, wherein scrapers having beveled ends are mounted in the vertical shaft, said beveled ends of said scrapers contact, through the bias of springs, the ribbon cable in the area of the at least two rollers.

14. Tool for mechanically removing encapsulating material from a fiber-optic ribbon cable, comprising:

a lower plate equipped with a cutting plate and at least one initial incision blade;

an upper cover;

at least two rollers housed within at least one internal space delimited by the lower plate and the upper cover, wherein said ribbon cable passes through the internal space between a calibrated orifice and an opening provided in the tool and winds around said at least two rollers;

wherein the lower plate and the upper cover are pressed against one another and traversed by a vertical shaft into which emerge, on one side, the opening and, on the other side, the calibrated orifice; and wherein scrapers having beveled ends are mounted in the vertical shaft, said beveled ends of said scrapers contact, through bias of springs, the ribbon cable near said at least two rollers.

* * * * *